United States Patent [19]

Lazzari

[11] 3,879,760

[45] Apr. 22, 1975

[54] MAGNETIC TRANSDUCERS

[75] Inventor: Jean-Pierre Lazzari, Villiers Saint Frederic, France

[73] Assignee: Compagnie Internationale pour l'Informatique, Louveciennes, France

[22] Filed: Feb. 22, 1974

[21] Appl. No.: 445,304

[30] Foreign Application Priority Data

Feb. 27, 1973 France .............................. 73.06826

[52] U.S. Cl. .............................................. 360/113

[51] Int. Cl. .............................................. G11b 5/38

[58] Field of Search ...................................... 360/113

[56] References Cited

UNITED STATES PATENTS

| | | | |
|---|---|---|---|
| 3,274,575 | 9/1966 | DeKoster | 360/113 |
| 3,731,007 | 5/1973 | Masuda et al. | 360/113 |
| 3,813,692 | 5/1974 | Brook et al. | 360/113 |

*Primary Examiner*—Vincent P. Canney

*Attorney, Agent, or Firm*—Kemon, Palmer & Estabrook

[57] ABSTRACT

Two magnetoresistive layers are magnetostatically coupled and electrically interconnected for summation of an electrical current passing through each of them in the same direction which is slanted at 45° with respect to the axes of easy magnetization of the layers, said axes being 90° to each other from one layer to the other. When this transducer structure is placed in close proximity to a magnetic record the information significant discontinuities of which are perpendicular to the spacing of the layers, the variations of the elec trical current applied to the layers and summed at their outputs are proportional to the value of the magnetic field from the record as seen through a window of a width equal to the spacing of the layers in the transducer.

2 Claims, 5 Drawing Figures

MAGNETIC TRANSDUCERS

BACKGROUND OF THE INVENTION

Magnetic materials are known which, under certain circumstances, exhibit an effect commonly known as the magneto-resistive effect, i.e., when an external magnetic field is applied to a body of such material, the intrinsic electrical resistance of the material varies according to the value of the said external magnetic field. Such a magnetoresistive effect cannot be sensed for layers of such materials where the thickness of the layers is between a few Angstroms up to about 100 A. Also it cannot be sensed, for layers having thicknesses higher than about 1.000 A, as the intensity of the effect decreases rapidly as the thickness increases. A non exhaustive list of such materials may for instance be found in an article by M. C. VAN ELST published in "PHYSICA," vol. XXV, 1959, pages 702–720 and entitled "The anisotropy in the magnetoresistance of some nickel alloys."

Transducers utilizing such magneto-resistive property are known. One of their advantages is that they respond to the value of a magnetic flux without necessitating any variation of said flux. When, for instance, such transducers are used as read-only magnetic heads of magnetic records, the output signals, i.e., the variations of an applied reference electrical current, are independent of the speed of travel of the record in the vicinity of the heads and read-out may occur even when such speed is zero. Another one of the advantages of such magnetoresistive transducers is that they present fair response within a very broad range of frequencies, from zero to several tens of megahertz for instance. Obviously, too, they provide a value of a response signal definitely higher than the amplitude values which may be obtained with transducers of the type which are responsive only to variations of a magnetic flux.

On the other hand, such magnetoresistive transducers cannot, without any further provision, discriminate between different directions of the external magnetic flux. This lack of discrimination is important when the transducers are used as read-only magnetic heads associated with magnetic records wherein the information has been recorded with reference to the direction of the magnetization of the information bits. This first drawback can be overcome when, according to the invention disclosed in co-pending application Ser. No. 315,476 filed Dec. 15, 1972 by the same inventor, the axis of easy magnetization of an anisotropic magnetoresistive layer is slanted by about 45° to the direction of passage of the electrical current through the layer.

Another drawback is the low power of discrimination of the location of the source of the external magnetic flux. For instance, a magnetoresistive member cannot operate satisfactorily for use as a read-out magnetic head for high density magnetic records.

In the above-identified co-pending application, Applicant proposed to sandwich a magnetoresistive layer between two thicker high permeability magnetic layers with interposition of insulating films between the facing surfaces of the magnetic layers of such a sandwich for magnetostatic relative coupling thereof. The thicker layers, due to their thickness, do not present any magnetoresistive response. Nevertheless there is need for more accurate power of resolution of a magnetoresistive transducer together with a simplified structure.

BRIEF SUMMARY OF THE INVENTION

According to this invention, a magnetoresistive transducer is made of two magnetoresistive layers which are magnetostatically coupled by an intervening dielectric layer, each magnetoresistive layer having an easy axis of magnetization oriented at substantially 45° with respect to an edge thereof and the said easy magnetization axes being relatively oriented at 90° from one layer to the next.

When such a structure is presented in close proximity to a magnetic record wherein the information significant discontinuities of the magnetization vector are parallel to an edge of the said layers, and when the magnetoresistive layers are fed with an electrical current under constant voltage, the variation of the current resulting from the summation of the current components passing through the layers will be proportional to the value of the magnetic flux from the record as seen through a window having a width equal to the spacing of said magnetoresistive layers in the structure.

BRIEF DESCRIPTION OF THE DRAWINGS

For describing the invention in full detail, reference is made to an illustrative embodiment shown by the accompanying drawings, it being understood that modifications of said embodiment are contemplated within the scope of the appended claims.

DETAILED DESCRIPTION

Figure 1:
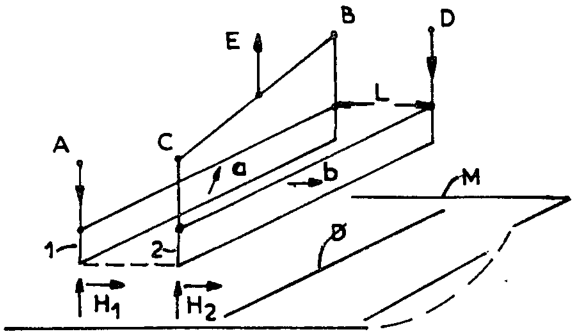
FIGS. 1 and 2 show examples of electrical interconnection of the two magnetoresistive layers of a preferred embodiment.
Figure 2:
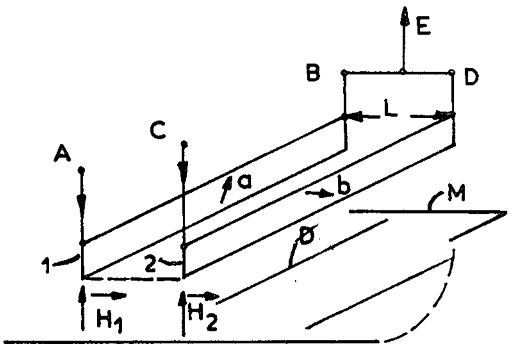

A magnetic transducer according to the invention essentially consists of two identical planar members, each made of a magnetoresistive layer, the layers being parallel and spaced from each other by a distance L. The structure is intended to be presented in close proximity to a high density record medium M whereon information is recorded as magnetization discontinuities such as ø. As shown in FIGS. 1 and 2, the planes of the members are perpendicular to the surface of the record medium whereas the discontinuities ø are transverse with respect to said length. The magnetoresistive members 1 and 2 are consequently affected by components such as $\vec{H_1}$ and $\vec{H_2}$ of the magnetic field emanating from the record. The layer 1 is provided with two conductors connected to terminals A and B and the layer 2 is similarly provided with two conductors connected to terminals C and D. Each layer receives an electrical current from a constant voltage supply, (not shown) said current being oriented along the length of the layers.

Each layer is made of an anisotropic magnetoresistive material wherein an easy axis of magnetization has been impressed, *a* for the layer 1 and *b* for the layer 2. Said axes are at 90° to each other and each axis is slanted by 45° with respect to the direction of flow of the electrical current I, (FIG. 3), and consequently with respect to the direction of the components emanating from the record.

Figure 3:
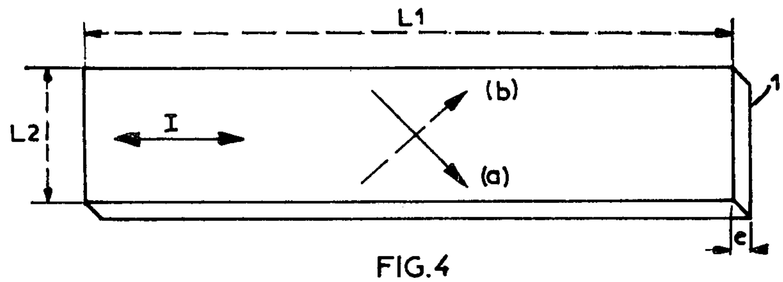
FIG. 3 shows a single magnetoresistive layer of embodiment FIGS. 1 and 2.

It is of common knowledge that an induced anisotropy can only be maintained in a magnetic layer when it is higher than the anisotropy due to the geometry, or shape, of the layer, i.e., an induced anisotropy can be maintained only for certain definite relations between the length L1, the width L2 and the thickness *e* of the layer, FIG. 3. A known relation is:

$$(i)\ H_c > B_r \cdot (e/L2)$$

when L1 is substantially high with respect to L2. $H_c$ denotes the coercive field and $B_r$ denotes the remanent inductivity of material of the layer. Such a relation cannot be practically satisfied because it would lead to a value of thickness for which no substantial magnetoresistive effect could be sensed. However, in a structure according to the invention, the two layers 1 and 2 are close and magnetostatically coupled, which reduces the action of the anisotropy of geometry and their axes of easy magnetization are preserved at the orientations set by the induced anisotropy. When for instance, the layer 1 presents an easy axis of magnetization oriented along the direction of the arrow (*a*), FIG. 3, the magnetization vector of the layer 2 will be orientated along the direction of the arrow (*b*) as shown in interrupted line in FIG. 3. Such orientations can be reversed, FIGS. 1, 2 and 5 for instance. These two conditions are the only ones which may be obtained, and each of said conditions is automatically obtained once the directions of the anisotropic axes have been ascertained. The product of the magnetization vectors for the complete structure consequently is parallel to the direction of the lengths of the layers.

Figure 4:
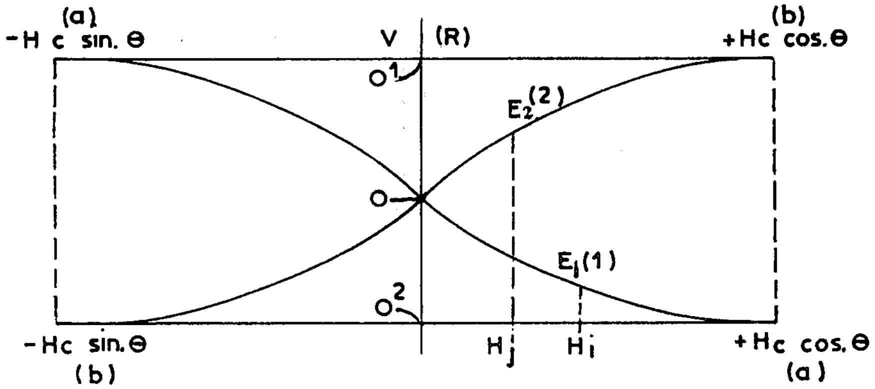
FIG. 4 is a graphical representation, and, FIG. 5 shows a perspective view of the device shown in FIGS. 1 and 2.

As detailed in the above identified co-pending application, a magnetoresistive member such as the one shown in FIG. 3 presents an electrical resistance which varies according to a law shown at (1) on FIG. 4 when the external magnetic field varies from a value $-H_c \sin \theta$ to a value $+H_c \cos \theta$. The value of the difference of potential across the terminals of the member V similarly varies. As the other member has its easy magnetization axis at 90° to the axis of the member of FIG. 3, the law of variation of the resistance (R) and consequently of the difference of potential across the terminals is symmetrical to the first, curve (2) of FIG. 4. As explained in the said co-pending application, the fixation of the zero point (0) is ensured in the load circuit of the member.

The differences of potential across the terminals of the two members, actually the drops of voltage across such terminals are summed at an output E, FIGS. 1 and 2. As the direction of the flow of the electrical current is independent of the variation of resistance of the layers, the electrical current may be introduced through the terminals A and D, and the outputs are at C and D, FIG. 1, or the electrical current may be introduced through the terminals A and C and the outputs are at B and D, FIG. 2.

It is apparent from FIG. 4 that, as long as external field components of identical values are applied to the layers 1 and 2, the "raw" sum of the voltage drops across the layers is a constant and equals $O^1O^2$. On the other hand, when the values of the field components $H_1$ and $H_2$ are different, one being for instance of a value $H_i$ and the other of a value $H_j$, the voltage drops $E_1$ and $E_2$ will no longer yield a sum equal to $O^1O^2$ but will yield a value of the difference between the values $E_1$ and $E_2$. In order to have an output signal responsive in value and sign to such a difference, it is sufficient to sum at E a constant voltage of the value $O^1O^2$ but of reverse polarity. Consequently, the output signal will be zero as long as $H_1$ equals $H_2$ and will present a value equal to the difference of such values as $E_1$ and $E_2$ with a polarity, or sign, indicative of the direction of such a difference of values. For instance, a summing amplifier may be connected as the E output of the device, with three summing inputs, one from C (or B) and B (or D), another from B (or C) and D (or B), and a further one receiving the constant voltage $-O^1O^2$.

The resolution capacity of such a transducer is obviously related to the spacing of the layers 1 and 2 and said spacing may be made quite small with respect to the distance between information significant discontinuities of the magnetized areas in the record of high density carried by the medium M. Actually, such a "window" as defined by the spacing of the layers 1 and 2 corresponds to the conventional airgap of a conventional magnetic transducer structure.

Figure 5:
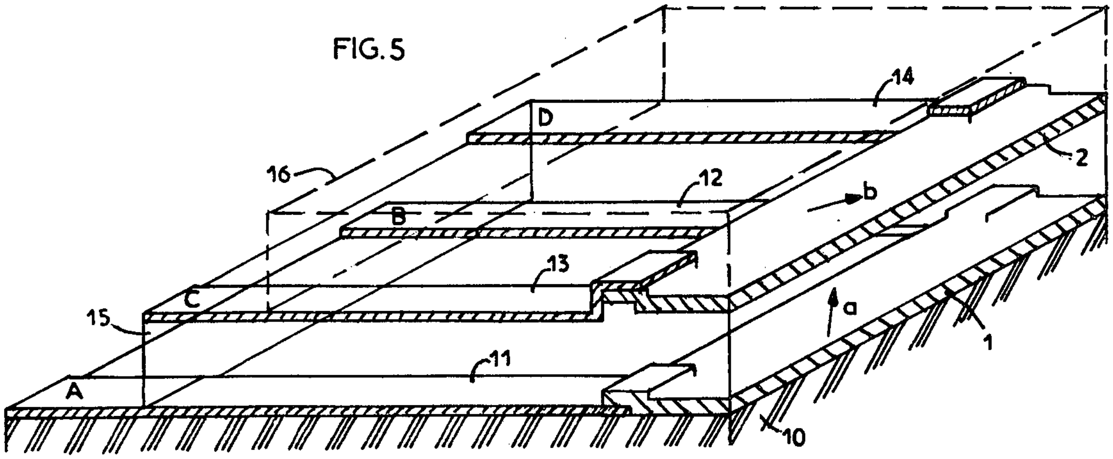

FIG. 5 illustrates a magnetic transducer structure according to the invention, obtained from successive evaporations of the materials to form its layers. Such a structure may, for instance be of the following geometrical dimensions: (referring also to FIGS. 1 to 3) - length L1 equals 1 millimetre, width L2 equals 60 microns, thickness *a* of each magnetoresistive layer equals about 600 Angstroms and spacing L of the order of 8 microns.

The copper connections 11 and 12 are first formed over a glass or ceramic substrate 10, said connections ending in terminals A and B. Thereafter a first magnetoresistive layer 1 is formed, which may consist of an iron-nickel alloy comprising 82 percent iron and 18 percent nickel by weight, not to be the subject of magnetostrictive effect. During deposition of said layer 1, a D.C. orienting magnetic field is applied for inducing an axis of easy magnetization *a* in the layer, according to a well known process. A layer of $SiO^2$ is thereafter formed over the layer 1, the thickness of the layer of $SiO_2$ being such as to provide the required spacing between the layer 1, which is already formed, and a layer 2 which is formed over the $SiO_2$ layer 15 in the same material and in the same way as was the layer 1 but with an orienting magnetic field oriented at 90° with respect to the field used during the deposition of the layer 1. The layer 2 with an easy magnetization axis *b* is formed at a lower temperature than that applied for the formation of the layer 1, so that the orientation of the axis *a* of the layer 1 is not disturbed. Over the exposed face of the layers 15 and 2 are formed conductive connections 13 and 14 ending at terminals C and D. When required, a protective layer of $SiO_2$ may be formed over the complete structure. The thicknesses of the substrate 10 and of said additional layer 16 are unimportant to the operation of the transducer.

When the number of operations must be reduced, the copper connections can be replaced by connections of the same material as the layers 1 and 2 and, they are formed simultaneously with the said layers 1 and 2.

What is claimed is:

1. Magnetic transducer comprising the combination of:

a first layer of anisotropic magnetoresistive magnetic material, a second layer of anisotropic magnetoresistive magnetic material, an intervening layer of insulating non-magnetic material magnetostatically coupling the said first and second magnetic layers, a pair of electrical terminals connected to opposite ends of the first layer for application thereto of an electrical current the direction of flow of which substantially parallels the greater dimension of said layer, a pair of electrical terminals connected to opposite ends of the second layer for application thereto of an electrical current the direction of flow of which substantially parallels the greater dimension of said layer, means for summing the outputs of the voltage drops across the terminals of the said first and second layers, said first and second layers being of identical geometry and each having an easy axis of magnetization of substantially 45° slant with respect to the said greater dimension, said axes of the said layers being relatively displaced by substantially 90° from the first layer to the second one.

2. Magnetic transducer according to claim 1, wherein each of the said first and second layers is of a thickness of a few hundreds of Angstroms and the said intervening layer is of a thickness of several tens of microns.

* * * * *